(12) United States Patent
Morita et al.

(10) Patent No.: US 11,821,339 B2
(45) Date of Patent: Nov. 21, 2023

(54) TURBOCHARGER

(71) Applicant: IHI Corporation, Tokyo (JP)

(72) Inventors: Isao Morita, Tokyo (JP); Richard Morrison, Northern Ireland (GB); Stephen Spence, Northern Ireland (GB)

(73) Assignee: IHI Corporation, Tokyo (JP)

( * ) Notice: Subject to any disclaimer, the term of this patent is extended or adjusted under 35 U.S.C. 154(b) by 51 days.

(21) Appl. No.: 17/643,076

(22) Filed: Dec. 7, 2021

(65) Prior Publication Data
US 2022/0090506 A1 Mar. 24, 2022

Related U.S. Application Data

(63) Continuation of application No. PCT/JP2020/019931, filed on May 20, 2020.

(30) Foreign Application Priority Data

Jun. 14, 2019 (JP) .................................. 2019-110818

(51) Int. Cl.
*F01D 9/02* (2006.01)

(52) U.S. Cl.
CPC ............ *F01D 9/02* (2013.01); *F05D 2220/40* (2013.01); *F05D 2240/12* (2013.01)

(58) Field of Classification Search
CPC . F01D 9/02; F01D 9/041; F01D 17/16; F01D 17/165; F01D 5/141
See application file for complete search history.

(56) References Cited

U.S. PATENT DOCUMENTS

| 6,375,420 | B1 * | 4/2002 | Tanuma ................. | F01D 5/141 416/243 |
| 7,255,530 | B2 * | 8/2007 | Vogiatzis ................. | F01D 9/02 415/159 |
| 2014/0248135 | A1 | 9/2014 | Inoue et al. | |
| 2015/0086396 | A1 * | 3/2015 | Nasir ..................... | F01D 5/141 417/407 |

(Continued)

FOREIGN PATENT DOCUMENTS

| JP | 11-257011 A | 9/1999 |
| JP | 2007-192124 A | 8/2007 |
| JP | 2009-243300 A | 10/2009 |

(Continued)

OTHER PUBLICATIONS

International Search Report dated Aug. 11, 2020 in PCT/JP2020/019931 filed on May 20, 2020.

*Primary Examiner* — Woody A Lee, Jr.
*Assistant Examiner* — Cameron A Corday
(74) *Attorney, Agent, or Firm* — Oblon, McClelland, Maier & Neustadt, L.L.P.

(57) ABSTRACT

A turbocharger includes: a mixed flow turbine including a turbine wheel; a turbine housing configured to house the turbine wheel, including a gas passage extending toward a leading edge of a blade of the turbine wheel; and nozzle vanes arranged in the gas passage in the circumferential direction of the turbine wheel, mutually adjacent two of the nozzle vanes forming a throat therebetween. Each nozzle vane is twisted with respect to a trailing edge of the nozzle vane as a twist center such that a width of the throat becomes narrower on the shroud side than on the hub side.

9 Claims, 7 Drawing Sheets

(56) References Cited

U.S. PATENT DOCUMENTS

2015/0218949 A1    8/2015   Higashimori

FOREIGN PATENT DOCUMENTS

| JP | 2009-243431 A | 10/2009 |
| JP | 2012-102745 A | 5/2012 |
| JP | 2014-169642 A | 9/2014 |
| JP | 2015-14252 A | 1/2015 |
| WO | WO 2014/038054 A1 | 3/2014 |

* cited by examiner

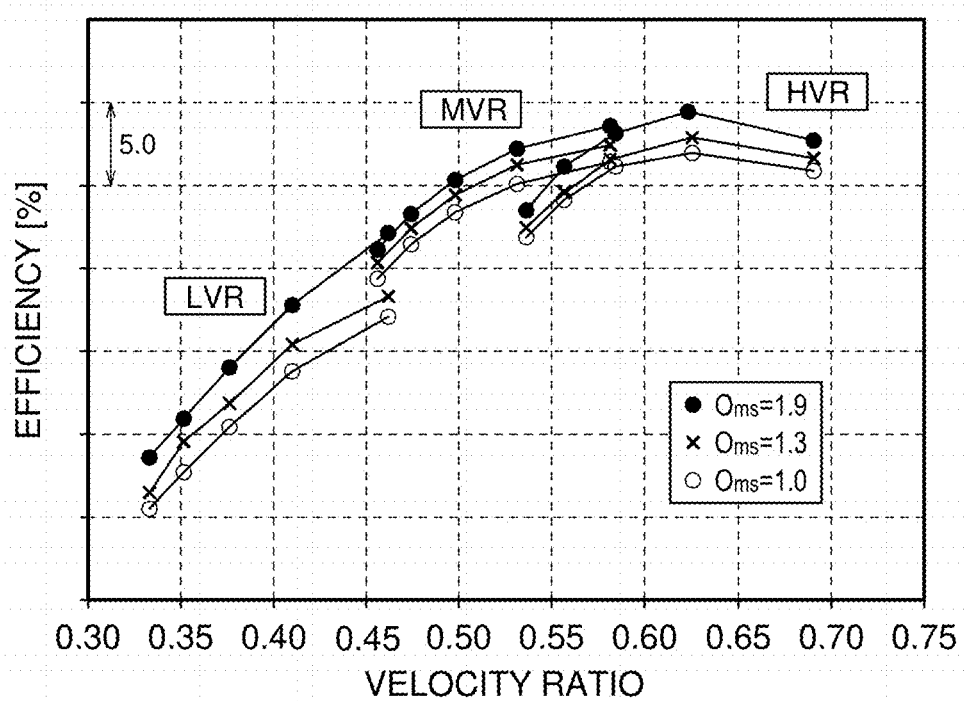

TURBOCHARGER

CROSS REFERENCE TO RELATED APPLICATIONS

This application is a continuation application of International Application No. PCT/JP2020/019931, now WO2020/250635, filed on May 20, 2020, which claims priority to Japanese Patent Application No. 2019-110818, filed on Jun. 14, 2019, the entire contents of which are incorporated by reference herein.

BACKGROUND

1. Technical Field

The present disclosure relates to a turbocharger including a mixed flow turbine.

2. Description of the Related Art

As turbines used in rotating machineries such as turbochargers, two types of turbines, i.e. a radial flow turbine and mixed flow turbine, have been know. It is also generally known that the mixed flow turbine can be made lighter than the radial turbine with the same capacity and has excellent transient response. Japanese Patent Laid-Open Application Publication No. 2012-102745 discloses a turbocharger using a mixed flow turbine.

SUMMARY

Generally, an increase in a relative flow angle (incidence angle) of working fluid relative to a blade of a wheel tends to cause flow separation on a suction side of the blade. The occurrence of the separation due to the increase in the relative flow angle increases the loss of turbine efficiency (so-called incident loss).

Since a radius of rotation defined by a leading edge of the blade in the mixed flow turbine decreases from a shroud side of the wheel toward a hub side of the wheel, a peripheral speed of the leading edge also decreases from the shroud side toward the hub side. With this decrease, the relative flow angle of the working fluid increases from the shroud side to the hub side, so that the separation tends to occur in a region closer to the hub side. Accordingly, the wheel of the mixed flow turbine, while having the advantages described above, is structurally more likely to increase the incidence loss more than that of a radial turbine having the same diameter.

The present disclosure has been made in view of the above circumstances. That is, it is an object of the present disclosure to provide a turbocharger capable of reducing incidence loss while utilizing the characteristics of a mixed flow turbine.

An aspect of the present disclosure is a turbocharger including: a mixed flow turbine including a turbine wheel; a turbine housing configured to house the turbine wheel, including a gas passage extending toward a leading edge of a blade of the turbine wheel; and nozzle vanes provided in the gas passage and arranged in the circumferential direction of the turbine wheel, mutually adjacent two of the nozzle vanes forming a throat therebetween; wherein each nozzle vane is twisted with respect to a trailing edge of the nozzle vane as a twist center such that a width of the throat becomes narrower on a shroud side than on a hub side.

Each nozzle vane may be rotatably provided in the gas passage. Each nozzle vane may be fixed to the gas passage.

When a length of the throat along an arrangement direction of the nozzle vanes is a throat width, the throat width on the hub side may be set to a value greater than 1 times and not greater than 2 times the throat width at a center in a span direction. The throat width may monotonically decrease from the hub side of the nozzle vane to the shroud side of the nozzle vane.

According to the present disclosure, it is possible to provide a turbocharger that is capable of reducing incident loss while taking advantage of the characteristics of the mixed flow turbine.

BRIEF DESCRIPTION OF THE DRAWINGS

FIG. 2A is a diagram of the nozzle vanes as viewed from an axial direction of a turbine wheel. FIG. 2B is a perspective view of a throat formed by the nozzle vanes.

FIG. 4A is the diagram when the hub throat opening ratio $O_{ms}$ is 1.0 at the design point, and FIG. 4B is the diagram when the hub throat opening ratio $O_{ms}$ is 1.9 at the design point.

FIG. 5A is the diagram when the hub throat opening ratio $O_{ms}$ is 1.0 at the non-design point. FIG. 5B is the diagram when the hub throat opening ratio $O_{ms}$ is 1.9 at the non-design point.

FIG. 6 is a graph showing efficiencies of the mixed flow turbine according to the present embodiment in which the hub throat opening ratio $O_{ms}$ is set to 1.0, 1.3 and 1.9, for each of the low speed range (LSR), the medium speed range (MSR) and the high speed range (HSR).

DESCRIPTION OF THE EMBODIMENTS

Figure 1:
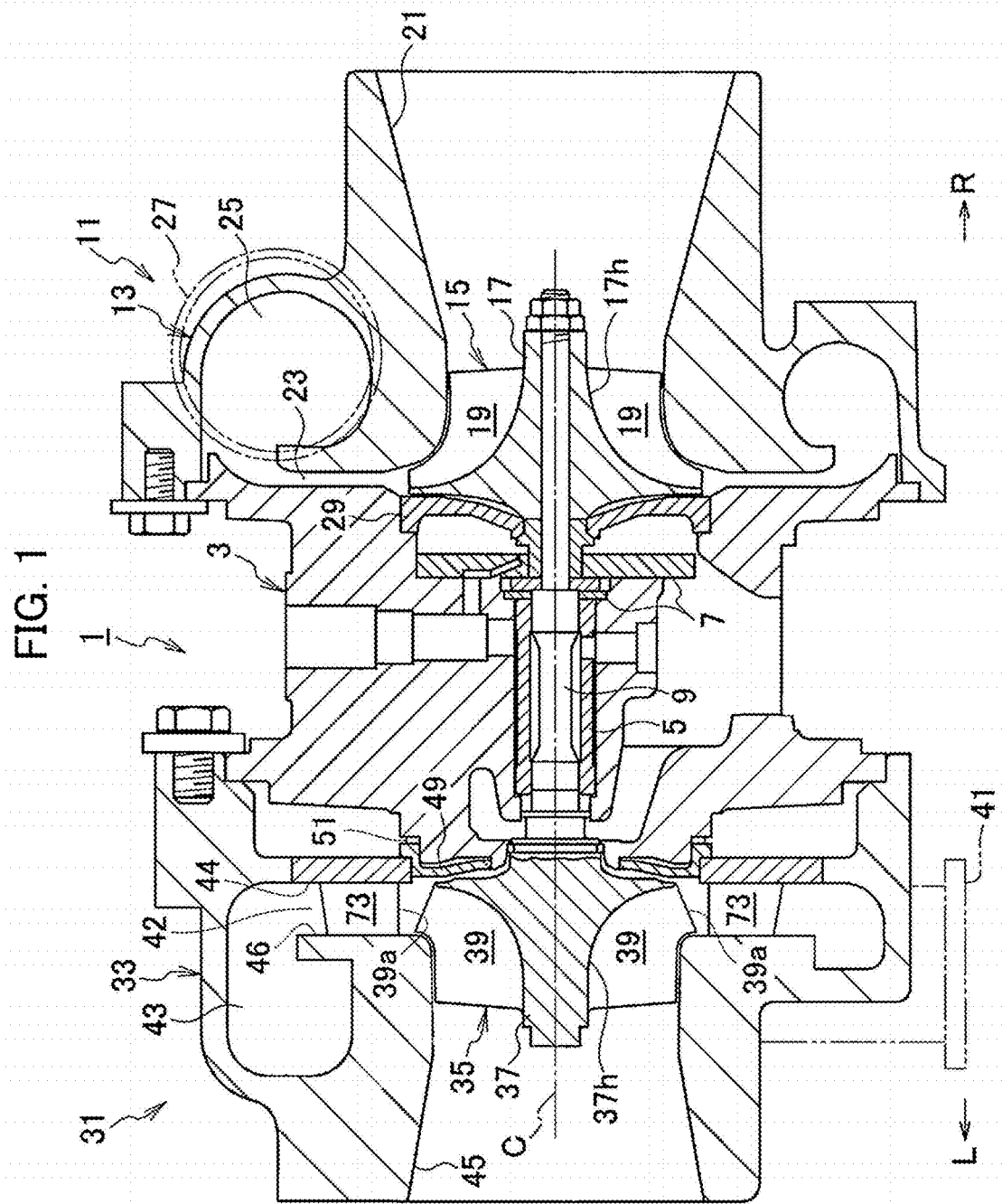
FIG. 1 is a front sectional view (meridian view) of a turbocharger according to an embodiment of the present disclosure.

An embodiment of the present disclosure will be described with reference to the drawings. For convenience of explanation, in the drawings, "L" indicates a left direction, "R" indicates a right direction, "ID" indicates a direction radially inward, "OD" indicates a direction radially outward, "RD" indicates a rotational direction of the turbine wheel (rotor shaft), and "SD" indicates a span direction of a nozzle vane.

The turbocharger 1 of this embodiment is mounted on, for example, a vehicle or a ship. The turbocharger 1 supercharges (compresses) air to be supplied to an engine by utilizing pressure energy of exhaust gas (an example of gas) from an engine (not shown).

Figure 2A:
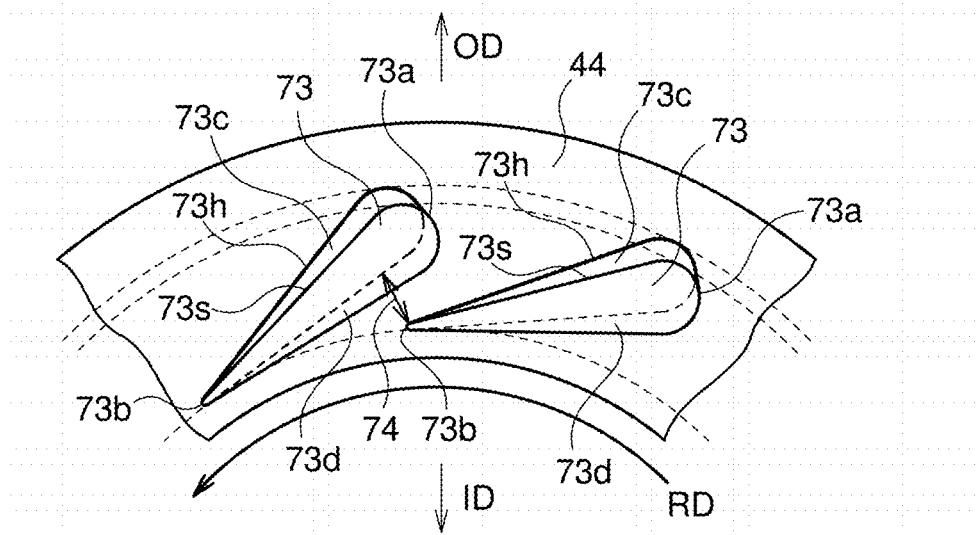
FIGS. 2A and 2B are diagrams illustrating nozzle vanes according to an embodiment of the present disclosure.
Figure 2B:
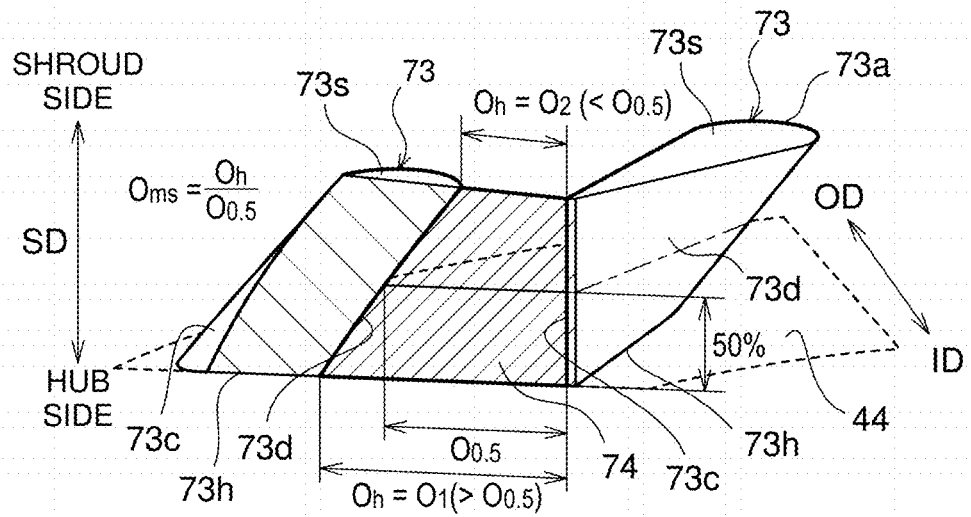

FIG. 1 is a front sectional view (meridian view) of the turbocharger 1 according to the present embodiment. FIGS. 2A and 2B are diagrams illustrating nozzle vanes 73 according to the present embodiment. FIG. 2A is a diagram of the nozzle vanes 73 as viewed from an axial direction of the turbine wheel 35. FIG. 2B is a perspective view of a throat 74 formed by the nozzle vanes 73. As shown in FIG. 1, the turbocharger 1 includes a bearing housing 3. In the bearing housing 3, a radial bearing 5 and a pair of thrust bearings 7 are provided. The bearings 5 and 7 are rotatably provided with a rotor shaft (turbine shaft) 9 extending in the axial direction. In other words, the rotor shaft 9 is rotatably provided in the bearing housing 3 by a plurality of bearings 5, 7.

A compressor 11 is located on the right side of the bearing housing 3 in FIG. 1. The compressor 11 uses centrifugal force to compress air. The compressor 11 includes a compressor housing 13 and a compressor wheel 15 rotatably housed in the compressor housing 13. The compressor wheel 15 is connected to a right end of the rotor shaft 9 and rotates together with the rotor shaft 9 and a turbine wheel 35 as described later. The compressor wheel 15 includes a compressor disk 17. The hub surface 17h of the compressor disk 17 extends radially outward (radially outside of the compressor wheel 15) from the right side. Further, compressor blades 19 are integrally formed on the hub surface 17h of the compressor disk 17 at intervals in the circumferential direction.

An air inlet 21 is formed on an inlet side (upstream side when viewed from an air flow direction) of a compressor wheel 15 in the compressor housing 13. The air inlet 21 is connected to an air cleaner (not shown) for cleaning air. A diffuser passage 23 is formed between the bearing housing 3 and the compressor housing 13. The diffuser passage 23 is annularly formed and positioned on an outlet side (downstream side when viewed from an air flow direction) of the compressor wheel 15. The diffuser passage 23 compresses the air discharged from the compressor wheel 15 while decelerating it.

A compressor scroll passage 25 is formed inside the compressor housing 13. The compressor scroll passage 25 spirally extends and communicates with the diffuser passage 23. An air outlet 27 is formed at an appropriate position of the compressor housing 13. The air outlet 27 is formed for discharging compressed air to the outside of the compressor housing 13 and is connected to an intake manifold (not shown) of the engine.

A seal plate 29 is provided on the right side of the bearing housing 3. The seal plate 29 is formed annularly to prevent leakage of compressed air to the thrust bearing 7 side.

As shown in FIG. 1, a mixed flow turbine 31 is located on the left side of the bearing housing 3. The mixed flow turbine 31 generates rotational force (rotational torque) by utilizing pressure energy of exhaust gas from an engine (not shown).

The mixed flow turbine 31 includes a turbine housing 33 and a turbine wheel 35 rotatably housed in the turbine housing 33. The turbine wheel 35 is connected to a left end of the rotor shaft 9, and rotates together with the rotor shaft 9 and the compressor wheel 15.

The turbine wheel 35 includes a turbine disk 37. The hub surface 37h of the turbine disk 37 extends radially outward (radially outside of the turbine wheel 35) from the left side (one side in the axial direction of the turbine wheel 35). Furthermore, turbine blades (blades) 39 are integrally formed on the hub surface 37h of the turbine disk 37. As described above, the turbine according to the present embodiment is a mixed flow turbine. Accordingly, a leading edge 39a of the turbine blade 39 extends from a shroud side thereof to a hub side thereof such that it approaches an axis C. The leading edge 39a is inclined with respect to the axis C.

A gas inlet 41 is formed at an appropriate position of the turbine housing 33. A gas inlet 41 is formed for introducing exhaust gas into the turbine housing 33 and is connected to an exhaust manifold (not shown) of the engine.

A turbine scroll passage 43 is formed on an inlet side (upstream side when viewed from a flow direction of exhaust gas) of the turbine wheel 35 in the turbine housing 33. The turbine scroll passage 43 is formed in a spiral shape and communicates with a gas inlet 41 via a gas passage 42.

The gas passage 42 extends radially inward from the turbine scroll passage 43 and opens toward the leading edge 39a of the turbine blade 39. The gas passage 42 includes a hub-side inner wall 44 as a first wall member and a shroud-side inner wall 46 as a second wall member.

The hub-side inner wall 44 is located concentrically with the turbine wheel 35 and extends toward the turbine wheel 35. The hub-side inner wall 44 is provided separately from the turbine housing 33 and has, for example, an annular shape. An inner peripheral edge of the hub-side inner wall 44 is fitted to an outer peripheral edge of a heat shielding plate 49.

The shroud-side inner wall 46 extends toward the turbine wheel 35 with a predetermined interval in the axial direction with respect to the hub-side inner wall 44. The shroud-side inner wall 46 may be formed integrally with the turbine housing 33, Otherwise, it may be provided separately from the turbine housing 33, and may be attached to the turbine housing 33.

A gas exhaust port 45 is formed on an outlet side (downstream side when viewed from a flow direction of exhaust gas) of the turbine wheel 35 in the turbine housing 33. The gas exhaust port 45 is formed to exhaust the exhaust gas from the turbine housing 33 and is connected to a catalyst (not shown) via a connection pipe (not shown).

A heat shielding plate 49 is provided on the left side surface of the bearing housing 3. The heat shielding plate 49 is annularly formed to shield heat from the turbine wheel 35 side. A wave washer 51 is provided between the left side surface of the bearing housing 3 and an outer edge portion of the heat shielding plate 49.

Nozzle vanes 73 are provided in the gas passage 42. In the present embodiment, the nozzle vanes 73 are arranged in the circumferential direction of the turbine wheel 35. The nozzle vanes 73 are fixed to the hub-side inner wall 44 and abuts on the shroud-side inner wall 46. The nozzle vanes 73 may be integrally formed with the hub-side inner wall 44. Otherwise, the nozzle vanes 73 may be separated from the shroud-side inner wall 46. In this case, the distance between these two is defined by, for example, restrictions on mounting, specifications or the like. The shroud-side inner wall 46 may be formed separately from the turbine housing 33 and may be attached to the turbine housing 33. In this case, the nozzle vanes 73 may be fixed to the shroud-side inner wall 46. As shown in FIG. 2A, each nozzle vane 73 has the same cord length from a shroud-side end face (end section) 73s to a hub-side end face (end section) 73h. Each nozzle vane 73 has the same blade shape (airfoil shape). The cord lengths or the blade shape of the nozzle vanes 73 does not have to be the same from the shroud-side end face 73s to the hub-side end face 73h.

As shown in FIG. 2A, a trailing edge 73b extends in a direction orthogonal to a plane on which the nozzle vanes 73 arranged. In other words, the trailing edge 73b is provided parallel to the axis C of the turbine wheel 35. Each nozzle vane 73 is twisted with respect to a trailing edge 73b of the nozzle vane 73 as a twist center such that a throat width $O_2$ on the shroud side becomes narrower than a throat width $O_1$ on the hub side, i.e., such that the width of the throat 74 becomes narrower on the shroud side than on the hub side. In other words, the airfoil (airfoil cross section) of each nozzle vane 73 rotates radially inward around the trailing edge 73b as the rotation center from the hub-side end face (end section) 73h to the shroud-side end face (end section) 73s. As described later, the throat width is a length of the throat 74 along an arrangement direction of the nozzle vanes 73.

Because the nozzle vanes 73 are twisted as described above, in the meridian plane, the leading edge 73a of each nozzle vane 73 is inclined with respect to the axis C of the turbine wheel 35 such that the shroud-side end is positioned radially inward of the hub-side end (see FIG. 2).

Mutually adjacent two nozzle vanes 73, 73 of the nozzle vanes 73 form a throat 74 therebetween. The throat 74 is formed at a position where the interval between a pressure side (positive pressure surface) 73c of one nozzle vane 73 of the above two nozzle vanes 73, 73 and a suction side (negative pressure surface) 73d of the other nozzle vane 73 of the above two nozzle vanes 73, 73 becomes narrowest. A "pressure side of the other nozzle vane 73" is, for example, a trailing edge 73b of the nozzle vane 73.

As described above, the trailing edge 73b is the twist center of the leading edge 73a. Therefore, the suction side 73d and the pressure side 73c, which are two side surfaces of the nozzle vane 73, are inclined than the trailing edge 73b, with respect to the hub-side inner wall 44 and the shroud-side inner wall 46. Accordingly, as shown in FIG. 2B, the shape of the throat 74 becomes a trapezoid in which a bottom thereof on the hub side is longer than a bottom thereof on the shroud side.

In the present embodiment, when a length of the throat 74 along the arrangement direction of the nozzle vanes 73 is defined as a throat width $O_h$, a throat width $O_1$ on the hub side (i.e., $O_h=O_1$) is set to a value greater than 1 times and not greater than 2 times a throat width $O_{0.5}$ (i.e., $O_h=O_{0.5}$) at the center in the span direction SD. For example, a throat width $O_2$ on the shroud side (i.e., $O_h=O_2$) and the throat width $O_1$ on the hub side are set to values such that their sum is equal to 2 times the center throat width $O_{0.5}$. In addition, the throat width $O_h$ monotonously increases from the shroud side to the hub side and does not decrease in the middle.

As described above, the nozzle vane 73 is twisted such that the inclination of the nozzle vane 73 in a direction opposite to the rotational direction RD of the turbine wheel 35 with respect to the leading edge 73a increases as it approaches from the trailing edge 73b to the leading edge 73a. Accordingly, the flow angle of the working fluid after passing through the throat 74 changes along the span direction SD of the nozzle vane 73, and the relative flow angle (incidence angle) with respect to the turbine blade 39 also changes along the leading edge 39a. Specifically, the change in the relative flow angle from the shroud side to the hub side is smaller than that in a case where the nozzle vane 73 would not be twisted.

Figure 3:
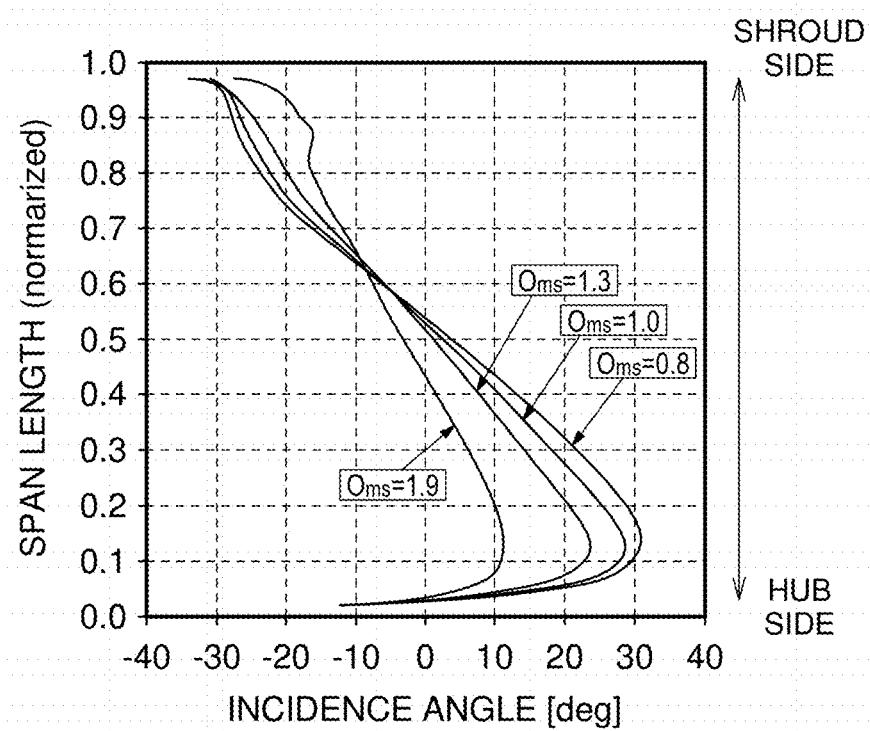
FIG. 3 is a graph showing changes in a relative flow angle (incidence angle) along an leading edge of a turbine blade according to the embodiment of the present disclosure for each of several hub throat opening ratios.

FIG. 3 is a graph showing changes in the relative flow angle (incidence angle) along the leading edge 39a of the turbine blade 39, for each of several hub throat opening ratios $O_{ms}$. This graph shows their relationship at the design point. The span length of the vertical axis is normalized. Therefore, the closer the value is to 0, the closer the position is to the hub side. Inversely, the closer the value is to 1, the closer the position is to the shroud side.

The hub throat opening ratio $O_{ms}$ in the figure represents the ratio of the throat width $O_2$ on the shroud side to the throat width $O_{0.5}$ at the center in the span direction SD. For example, when $O_{ms}$ is 1.9, the throat width $O_2$ on the shroud side is 1.9 times the center throat width $O_{0.5}$. When $O_{ms}$ is 1.0, a throat width $O_2$ on the shroud side is equal to the throat width $O_{0.5}$. This means that the nozzle vane 73 is not twisted.

The analysis of FIG. 3 was obtained under a condition in which the sum of the throat width $O_2$ on the shroud side and the throat width $O_1$ on the hub side was set to be equal to 2 times the center throat width $O_{0.5}$. Therefore, the area of the throat 74 is constant irrespective of changes in the throat width $O_2$ on the shroud side and the throat width $O_1$ on the hub side. That is, these results represent a comparison between turbines of the same capacity because the total amount of working fluid passing through the nozzle vane 73 is almost unchanged even when the hub throat opening ratio $O_{ms}$ has any value.

From FIG. 3, it can be found that the change in the relative flow angle from the shroud side to the hub side becomes smaller as the nozzle vane 73 is more twisted, compared with the case where the nozzle vane 73 is not twisted (i.e., $O_{ms}=1.0$). Accordingly, by twisting the nozzle vanes 73 in the mixed flow turbine, generation or growth of separation on the hub side of the turbine wheel 35 can be suppressed, and as a result, incidence loss can be reduced.

Figure 4A:
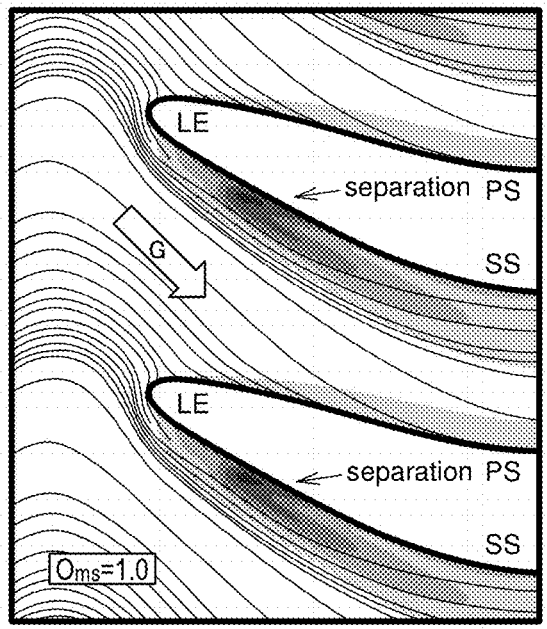
FIGS. 4A and 4B are diagrams illustrating streamlines and an entropy (static entropy) distribution of a working fluid in the vicinity of the leading edge of the turbine blade.
Figure 4B:
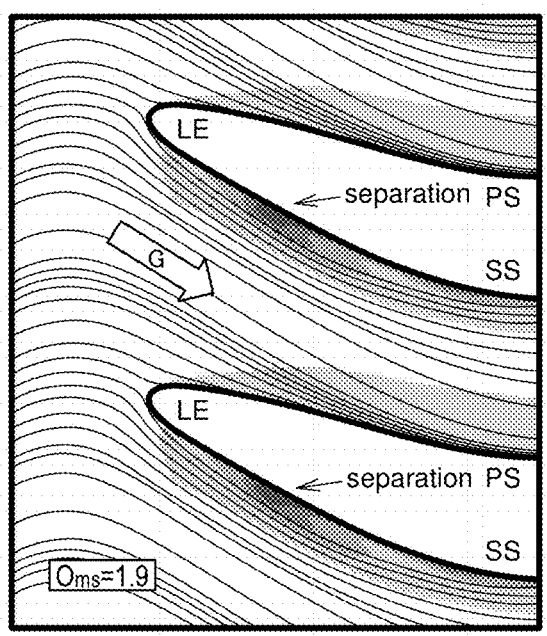
Figure 5A:
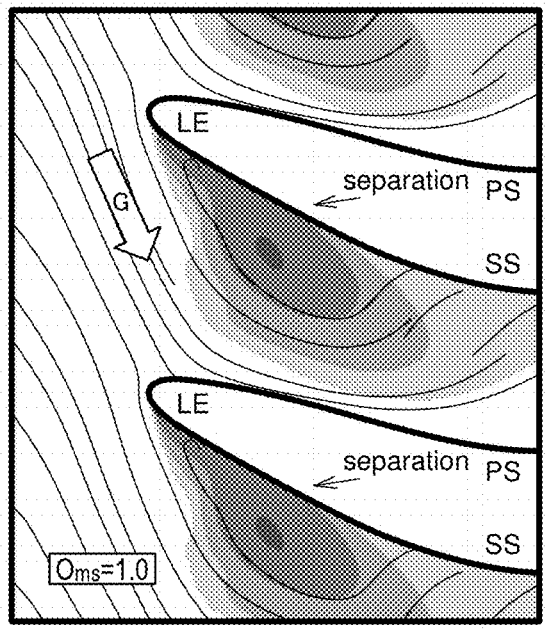
FIGS. 5A and 5B are diagrams illustrating streamlines and an entropy (static entropy) distribution of a working fluid in the vicinity of the leading edge of the turbine blade.
Figure 5B:
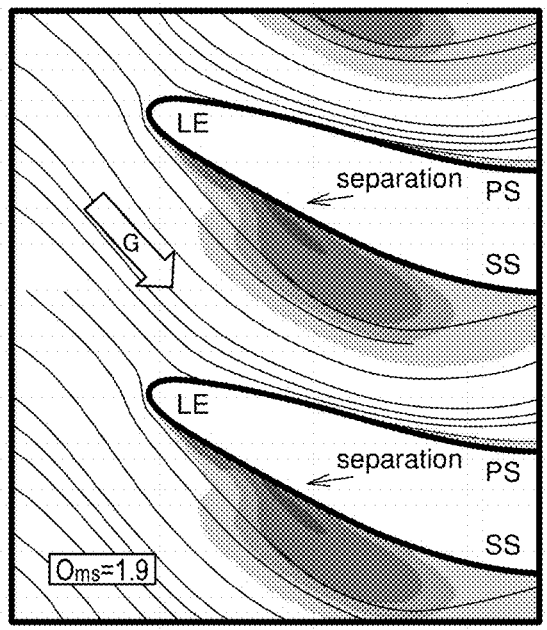

FIGS. 4A and 4B are diagrams illustrating the streamlines and an entropy (static entropy) distribution of the working fluid G in the vicinity of the leading edge 39a (LE) of the turbine blade 39. FIG. 4A is the diagram when the hub throat opening ratio $O_{ms}$ is 1.0 at the design point. FIG. 4B is the diagram when the hub throat opening ratio $O_{ms}$ is 1.9 at the design point. FIGS. 5A and 5B are diagrams showing the streamline and an entropy (static entropy) distribution of the working fluid G in the vicinity of the leading edge 39a (LE) of the turbine blade 39. FIG. 5A is the diagram when the hub throat opening ratio $O_{ms}$ is 1.0 at the non-designed point. FIG. 5B is the diagram when the hub throat opening ratio $O_{ms}$ is 1.9 at the non-designed point. Any figures are obtained by three-dimensional steady viscous CFD analysis, and show the leading edge 39a (LE) of the turbine blade 39 when the normalized span length is 0.1. Further, a term "PS" indicates the pressure side (positive pressure surface) of the turbine blade 39, and a term "SS" indicates the suction side (negative pressure surface) of the turbine blade 39.

Focusing on the circumference of the leading edge 39a (LE) in FIGS. 4A to 5B, it is found that the relative flow angle (incidence angle) of the working fluid G when the hub throat opening ratio $O_{ms}$ is 1.9 is smaller than that when the hub throat opening ratio $O_{ms}$ is 1.0, and the concentration of the working fluid is also released. In addition, the region in which the entropy is relatively high when the hub throat opening ratio $O_{ms}$ is 1.9 is narrower than that when the hub throat opening ratio $O_{ms}$ is 1.0, and it is found that the region in which separation occurs is reduced and the loss of energy is suppressed.

Accordingly, as acknowledged from these figures, the twist of the nozzle vanes 73 in the mixed flow turbine can suppress the occurrence or growth of separation on the hub side of the turbine wheel 35, thereby reducing the incidence loss.

FIG. 6 is a graph showing efficiencies of the mixed flow turbine according to the present embodiment in which the hub throat opening ratio $O_{ms}$ is set to 1.0, 1.3 and 1.9, for each of the low speed range (LSR), the medium speed range (MSR) and the high speed range (HSR). As shown in this figure, it is found that the efficiency of the mixed flow turbine is better as the hub throat opening ratio $O_{ms}$ is larger. Moreover, this tendency is observed in all peripheral speed ranges.

Modified Example

The nozzle vane 73 according to the present disclosure is not limited to the use as the fixed nozzle vane described above, and may be configured as a variable nozzle vane used in the variable nozzle unit. That is, the nozzle vane 73 may be rotatably provided in the gas passage 42. When the nozzle vane 73 is a variable nozzle vane, it may be configured to form the throat 74 having the aforementioned hub throat opening ratio at an angle set in any state from the open state to the closed state.

For example, the nozzle vane 73 may be applied to a variable nozzle unit 53 described later. The variable nozzle unit 53 is mounted on the variable geometry system turbocharger and adjusts a flow passage area of exhaust gas supplied to the turbine wheel 35 side.

Hereinafter, an example in which the nozzle vane 73 is applied to the variable nozzle unit 53 will be described.

Figure 7:
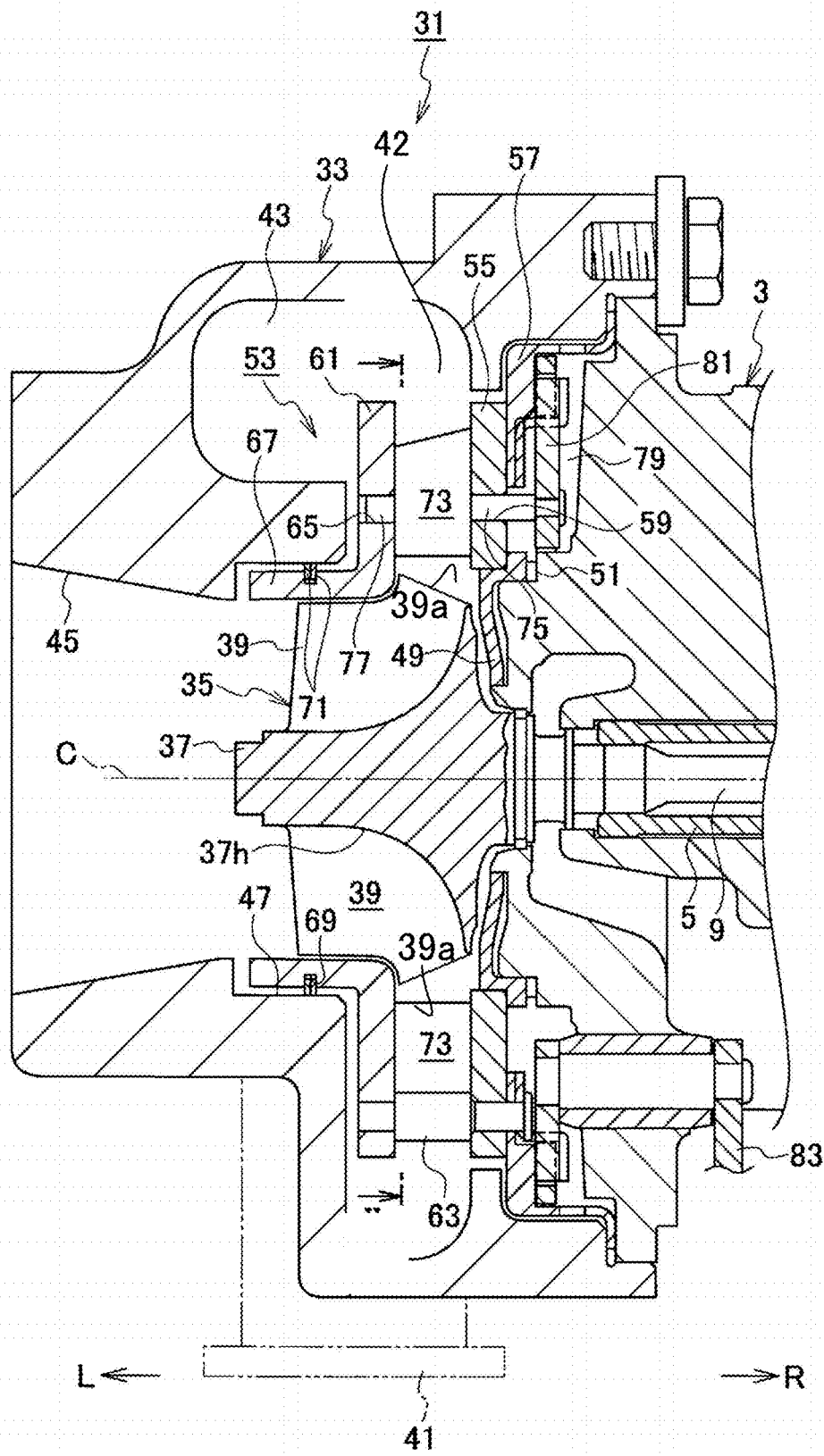
FIG. 7 is a front sectional view (meridian view) of a mixed flow turbine in a variable geometry system turbocharger according to a modification of the present embodiment.

FIG. 7 is a front sectional view (meridian view) of a mixed flow turbine in a variable geometry system turbocharger according to a modification of the present embodiment. As shown in FIG. 7, a nozzle ring 55 as a first wall member is provided radially outward of (i.e., on the inlet side of) the turbine wheel 35 in the turbine housing 33. The nozzle ring 55 is located concentrically with the turbine wheel 35 via a support ring 57. The nozzle ring 55 is formed in an annular shape, for example. An inner peripheral edge of the nozzle ring 55 is fitted to the outer peripheral edge of the heat shielding plate 49. First support holes 59 are formed penetrating through the nozzle ring 55 at equal intervals in the circumferential direction. An outer peripheral edge of the support ring 57 is sandwiched by the bearing housing 3 and the turbine housing 33.

A shroud ring 61 as a second wall member is provided at a position separated from the nozzle ring 55 in the axial direction. The shroud ring 61 is provided concentrically with the nozzle ring 55 and is integrated with the nozzle ring 55 via connecting pins 63. In other words, the shroud ring 61 is spaced apart from the nozzle ring 55 in the axial direction of the turbine wheel 35 to face the nozzle ring 55. The shroud ring 61 is formed in an annular shape, for example. Second support holes 65 are formed penetrating through the shroud ring 61. The second support holes 65 are formed at equal intervals in the circumferential direction to be aligned with the first support holes 59 of the nozzle ring 55. The connecting pins 63 have a function to set a distance between an opposing surface of the nozzle ring 55 and an opposing surface of the shroud ring 61.

The shroud ring 61 has a shroud portion 67 on an inner peripheral edge side thereof. The shroud portion 67 is formed in a cylindrical shape to cover an outer edges of the turbine blades 39. The shroud portion 67 protrudes in the left direction (one side in the axial direction of the turbine wheel 35) and is positioned inside a step portion 47 of the turbine housing 33. A ring groove 69 is formed on an outer peripheral surface of the shroud portion 67 of the shroud ring 61. Further, seal rings 71 are provided on an inner peripheral surface of the step portion 47 of the turbine housing 33. The seal rings 71 are contact with and press against the inner peripheral surface by their own elastic forces (i.e., elastic forces of the seal rings 71) to suppress leakage of exhaust gas from the turbine scroll passage 43 side. Inner peripheral edges of the seal rings 71 are fitted into the ring groove 69 of the shroud ring 61.

As shown in FIG. 7, the nozzle ring 55 and the shroud ring 61 constitute the gas passage 42. The nozzle vanes 73 as variable nozzle vanes are circumferentially arranged in the gas passage (in other words, between the nozzle ring 55 and the shroud ring 61). Each nozzle vane 73 can be rotated (swung) about an axis parallel to the axis C of the turbine wheel 35.

A first blade shaft 75 is integrally formed on the right side surface of each nozzle vane 73, which faces the nozzle ring 55. The first blade shaft 75 is rotatably supported by the corresponding first support hole 59 of the nozzle ring 55. A second blade shaft 77 is integrally formed concentrically with the first blade shaft 75 on the left side surface of each nozzle vane 73, which faces the shroud ring 61. The second blade shaft 77 is rotatably supported by the corresponding second support hole 65 of the shroud ring 61. Each nozzle vane 73 has a first flange portion (not shown) on a base end side of the nozzle vane 73, which can contact with the opposing surface of the nozzle ring 55. Each nozzle vane 73 has a second flange portion (not shown) on a tip end side of the second blade shaft 77, which can be contact with the opposing surface of the shroud ring 61. Note that each nozzle vane 73 is a bimodal type having a first blade shaft 75 and a second blade shaft 77, but may be a cantilever type in which the second blade shaft 77 is omitted.

As shown in FIG. 7, a link mechanism 81 is provided in an annular link chamber 79 that is formed on the opposite side of the opposing surface of the nozzle ring 55, for synchronously rotating the nozzle vanes 73. The link mechanism 81 has a known structure disclosed in Japanese Patent Application Laid-Open Application Nos. 2009-243431, 2009-243300, 2014-169642 (U.S. Patent Application Publication No. 2014/0248135) or the like. The link mechanism 81 is connected with a rotary actuator (not shown) such as a motor or a cylinder which rotates the nozzle vanes 73 in the opening/closing direction, via the power transmission mechanism 83.

In this modified example, the above effects can also be obtained. That is, by the twist of the nozzle vanes 73 in the mixed flow turbine, generation or growth of separation on the hub side of the turbine wheel 35 can be suppressed, and as a result, incidence loss can be reduced.

It should be noted that the present disclosure is not limited to the embodiments described above, but is indicated by the description of the claims and further includes all modifications within the meaning and scope of the description of the claims.

What is claimed is:

1. A turbocharger comprising:
  a mixed flow turbine including a turbine wheel;
  a turbine housing configured to house the turbine wheel, including a gas passage extending toward a leading edge of a blade of the turbine wheel; and
  nozzle vanes provided in the gas passage and arranged in the circumferential direction of the turbine wheel, mutually adjacent two of the nozzle vanes forming a throat therebetween, wherein
  a throat width is a length of the throat along an arrangement direction of the nozzle vanes,
  each nozzle vane is twisted with respect to a trailing edge of the nozzle vane as a twist center such that the throat width becomes narrower on a shroud side than on a hub side, and a sum of the throat widths on the shroud side and on the hub side is equal to two times the throat width at a center of the throat in a span direction of the nozzle vanes.

2. The turbocharger according to claim 1, wherein each nozzle vane is rotatably provided in the gas passage.

3. The turbocharger according to claim 1, wherein each nozzle vane is fixed to the gas passage.

4. The turbocharger according to claim 1, wherein the throat width on the hub side is set to a value greater than 1 times and not greater than two times the throat width at a center in the span direction.

5. The turbocharger according to claim 2, wherein the throat width on the hub side is set to a value greater than 1 times and not greater than two times the throat width at a center in the span direction.

6. The turbocharger according to claim 3, wherein the throat width on the hub side is set to a value greater than 1 times and not greater than two times the throat width at a center in the span direction.

7. The turbocharger according to claim 4, wherein the throat width monotonically decreases from the hub side of the nozzle vane to the shroud side of the nozzle vane.

8. The turbocharger according to claim 5, wherein the throat width monotonically decreases from the hub side of the nozzle vane to the shroud side of the nozzle vane.

9. The turbocharger according to claim 6, wherein the throat width monotonically decreases from the hub side of the nozzle vane to the shroud side of the nozzle vane.

\* \* \* \* \*